United States Patent
Filip et al.

(10) Patent No.: US 11,650,708 B2
(45) Date of Patent: *May 16, 2023

(54) SYSTEM AND METHOD OF INDICATING THE DISTANCE OR THE SURFACE OF AN IMAGE OF A GEOGRAPHICAL OBJECT

(71) Applicant: Google LLC, Mountain View, CA (US)

(72) Inventors: Daniel Joseph Filip, San Jose, CA (US); Andrew Timothy Szybalski, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,462

(22) Filed: Oct. 7, 2021

(65) Prior Publication Data

US 2022/0100348 A1    Mar. 31, 2022

Related U.S. Application Data

(63) Continuation of application No. 15/292,226, filed on Oct. 13, 2016, now Pat. No. 11,157,129, which is a
(Continued)

(51) Int. Cl.
*G06F 3/0481* (2022.01)
*G06F 16/29* (2019.01)
(Continued)

(52) U.S. Cl.
CPC ....... *G06F 3/04812* (2013.01); *G01C 21/367* (2013.01); *G06F 3/048* (2013.01); *G06F 16/29* (2019.01)

(58) Field of Classification Search
CPC ...... G06F 3/04812; G06F 16/29; G06F 3/048; G01C 21/367
See application file for complete search history.

(56) References Cited

U.S. PATENT DOCUMENTS

| | | |
|---|---|---|
| 5,559,707 A | 9/1996 | DeLorme |
| 6,009,190 A | 12/1999 | Szeliski |

(Continued)

FOREIGN PATENT DOCUMENTS

| | | |
|---|---|---|
| EP | 1426904 | 6/2004 |
| JP | 2004342004 | 12/2004 |

(Continued)

OTHER PUBLICATIONS

Agarwal, "How to Embed FLV Flash Videos in your Blog?", Digital Inspiration, http://labnol.blogspot.com/2006/08/how-to-embed-flv-flash-videos-in-your.html, retrieved on Jun. 27, 2022, 1 page.
(Continued)

*Primary Examiner* — Tadesse Hailu
*Assistant Examiner* — Darrin Hope
(74) *Attorney, Agent, or Firm* — Dority & Manning, P.A.

(57) ABSTRACT

A system and method is provided that displays cursors for street level images, where the cursor changes appearance based on the objects in the image, such as the geographic distance between the objects and the camera position and the surface of the objects. For example, the cursor may appear to lie flat against the objects in the image change size based on the distance between the camera and object's surface.

16 Claims, 15 Drawing Sheets

Related U.S. Application Data continuation of application No. 12/415,102, filed on Mar. 31, 2009, now Pat. No. 9,477,368.

(51) Int. Cl.

| | | |
|---|---|---|
| *G06F 3/048* | (2013.01) | |
| *G01C 21/36* | (2006.01) | |
| *G06F 3/04812* | (2022.01) | |

(56) References Cited

U.S. PATENT DOCUMENTS

| | | |
|---|---|---|
| 6,097,393 A | 8/2000 | Prouty, IV |
| 6,157,747 A | 12/2000 | Szeliski |
| 6,285,317 B1 | 9/2001 | Ong |
| 6,346,938 B1 | 2/2002 | Chan |
| 6,477,268 B1 | 11/2002 | Chiang |
| 6,563,529 B1 | 5/2003 | Jongerius |
| 6,687,753 B2 | 2/2004 | Schneider |
| 6,717,608 B1 | 4/2004 | Mancuso |
| 6,771,304 B1 | 8/2004 | Mancuso |
| 6,885,392 B1 | 4/2005 | Mancuso |
| 6,895,126 B2 | 5/2005 | Bernardo |
| 7,006,707 B2 | 2/2006 | Peterson |
| 7,050,102 B1* | 5/2006 | Vincent .......... H04N 5/23218 348/E5.025 |
| 7,096,428 B2 | 8/2006 | Foote |
| 7,158,878 B2 | 1/2007 | Rasmussen |
| 7,239,760 B2 | 7/2007 | Di Bernardo |
| 7,161,604 B2 | 10/2007 | Higgins |
| 7,424,133 B2 | 9/2008 | Schultz |
| 7,460,953 B2 | 12/2008 | Herbst |
| 7,526,718 B2 | 4/2009 | Samadani |
| 7,574,381 B1 | 8/2009 | Lin-Hendel |
| 7,577,316 B2 | 8/2009 | Di Bernardo |
| 7,643,673 B2 | 1/2010 | Rohlf |
| 7,787,659 B2 | 8/2010 | Schultz |
| 7,805,025 B2 | 9/2010 | Di Bernardo |
| 7,813,596 B2 | 10/2010 | Di Bernardo |
| 10,540,294 B2 | 1/2020 | Zhu et al. |
| 2001/0033283 A1 | 10/2001 | Liang et al. |
| 2002/0010734 A1 | 1/2002 | Ebersole et al. |
| 2002/0130838 A1 | 9/2002 | Feierbach |
| 2002/0138338 A1* | 9/2002 | Trauth .............. G06Q 30/02 705/7.13 |
| 2003/0080978 A1 | 5/2003 | Navab et al. |
| 2003/0142115 A1 | 7/2003 | Endo et al. |
| 2003/0210228 A1 | 11/2003 | Ebersole |
| 2004/0196282 A1 | 10/2004 | Oh |
| 2004/0239699 A1 | 12/2004 | Uyttendaele et al. |
| 2004/0257384 A1 | 12/2004 | Park et al. |
| 2005/0004749 A1 | 1/2005 | Park |
| 2005/0116964 A1 | 6/2005 | Kotake et al. |
| 2006/0073853 A1 | 4/2006 | Cighir et al. |
| 2006/0074549 A1 | 4/2006 | Takahashi et al. |
| 2006/0087507 A1* | 4/2006 | Urano .............. G06T 19/00 345/421 |
| 2006/0132482 A1 | 6/2006 | Oh |
| 2006/0238383 A1 | 10/2006 | Kimchi et al. |
| 2006/0271287 A1* | 11/2006 | Gold .............. G06F 3/04817 701/426 |
| 2007/0030396 A1 | 2/2007 | Zhou et al. |
| 2007/0035563 A1 | 2/2007 | Biocca et al. |
| 2007/0070069 A1 | 3/2007 | Samarasekera et al. |
| 2007/0110338 A1 | 5/2007 | Snavely et al. |
| 2007/0146325 A1* | 6/2007 | Poston .............. G06F 3/038 345/163 |
| 2007/0273758 A1 | 11/2007 | Mendoza et al. |
| 2008/0043020 A1* | 2/2008 | Snow .............. G01C 21/3635 345/427 |
| 2008/0089558 A1 | 4/2008 | Vadon et al. |
| 2008/0143709 A1 | 6/2008 | Fassero et al. |
| 2008/0189031 A1 | 8/2008 | Meadow et al. |
| 2008/0195315 A1 | 8/2008 | Hu et al. |
| 2008/0235630 A1 | 9/2008 | Kenney |
| 2008/0309668 A1 | 12/2008 | Borovikov |
| 2009/0237403 A1 | 9/2009 | Horii et al. |
| 2010/0142748 A1* | 6/2010 | Oldroyd .............. G06V 20/176 715/863 |
| 2013/0135288 A1* | 5/2013 | King .............. G06F 3/04812 345/419 |

FOREIGN PATENT DOCUMENTS

| | | |
|---|---|---|
| JP | 2005250560 | 9/2005 |
| JP | 2008520052 | 6/2008 |
| WO | WO 2010114878 | 10/2010 |

OTHER PUBLICATIONS

Bay et al., "SURF: Speeded Up Robust Features", Computer Vision—European Conference on Computer Vision 2006, Jul. 26, 2006, pp. 1-14.

Chen, "QuickTime VR—An Image-Based Approach to Virtual Environment Navigation", Proceedings of the 22$^{nd}$ Annual Conference on Computer Graphics and Interactive Techniques Aug. 6-11, 1995, Los Angeles, California, pp. 29-38.

Cobzas et al., "A panoramic model for remote robot environment mapping and predictive display", International Journal of Robotics and Automation, 2005, 11 pages.

Darken et al., "Map Usage in Virtual Environments: Orientation Issues," Proceedings of the IEEE Virtual Reality Conference, IEEE, 1999, pp. 133-140.

Dykes et al., "Virtual environments for student fieldwork using networked components," International Journal of Geographical Information Science, vol. 13, No. 4, pp. 397-416, Taylor & Francis Ltd., 1999.

Dykes, "An approach to virtual environments for visualization using linked georeferenced panoramic imagery," Computers, Environment and Urban Systems, 24, 2000, pp. 127-152.

Endo et al., "Image-Based Walk-Through System for Large-Scale Scenes", Proceedings of the 4$^{th}$ International Conference on Virtual Systems and Multimedia, Nov. 18-20, 1988, Gifu, Japan, 6 pages.

EP Patent Office, Partial International Search Report, International Appln. No. PCT/US2008/006683, dated Nov. 7, 2008, 5 pages.

First Office Action, dated Apr. 1, 2013, Japanese Patent Application No. 2010-548720, Japanese Patent Office, 7 pages (English language translation appended).

Hirose, "Image-Based Virtual World Generation," IEEE MultiMedia, vol. 4, No. 1, 1997, pp. 27-33.

International Preliminary Report on Patentability for Application No. PCT/US2010/29337, dated Oct. 4, 2011, 8 pages.

International Preliminary Report on Patentability, dated Sep. 10, 2010, International Patent Application No. PCT/US2009/001216, The International Bureau of WIPO, Geneva, Switzerland, 11 pages.

International Search Report and Written Opinion for International Patent Application PCT/US2009/001216, European Patent Office, Netherlands, completed Sep. 8, 2009, dated Sep. 21, 2009, 20 pages.

International Search Report and Written Opinion, PCT/US2010/29337, dated Jun. 1, 2010, 9 pages.

Kadobayashi, et al., "Combined Use of 2D Images and 3D Models for Retrieving and Browsing Digital Archive Contents", Videometrics VIII, Proceedings of the SPIE—The International Society for Optical Engineering, San Jose, CA, 2005, 10 pages.

Kang et al., "Virtual Navigation of Complex Scenes Using Clusters of Cylindrical Panoramic Images", Cambridge Research Laboratory—Technical Report Series, CRL 97/5, Sep. 1997, 30 pages.

Kato et al., "Town Digitizing: Recording of Street Views by Using Omnidirectional Vision Sensors", 26$^{th}$ Annual Conference of the IEEE Industrial Electronics Society, Oct. 22-28, 2000, Nagoya, Aichi, Japan, pp. 2571-2576.

Kimber et al., "FlyAbout: Spatially Indexed Panoramic Video", Proceedings of the 9$^{th}$ ACM International Conference on Multimedia, Sep. 30-Oct. 5, 2001, Ottawa, Ontario, Canada, pp. 339-347.

Kourogi et al., "A Panorama-Base Technique for Annotation Overlay and its Real-Time Implementation", IEEE International Conference on Multimedia and Expo, Jul. 30-Aug. 2, 2000, New York, New York, 4 pages.

(56) References Cited

OTHER PUBLICATIONS

Kourogi et al., "Improvement of Panorama-Based Annotation Overlay Using Omnidirectional Vision and Inertial Sensors", Proceedings of the 4$^{th}$ IEEE International Symposium on Wearable Computers, Oct. 16-17, 2000, Atlanta, Georgia, pp. 183-184.

Kulju et al., "Route Guidance Using a 3D City Mobile Device", Mobile HCI02 Workshop: Mobile Tourism Support Systems, 2002, 6 pages.

Lippman, Andrew, "Movie-Maps: An Application of the Optical Videodisc to Computer Graphics," ACM Siggraph Computer Graphics, vol. 14, No. 3, 1980, pp. 32-42.

Lowe et al., "Fitting Parameterized Three-Dimensional Models to Images," IEEE Transactions on Pattern Analysis and Machine Intelligence, 13, May 5, 1991, pp. 441-450.

Murphy et al., "Air-Mobile Ground Surveillance and Security System (AMGSSS) Project Summary Report", Technical Document 2914, Defense Special Weapons Agency (DSWA) and Physical Security Equipment Management Office (PSEMCO), 80 pages, Sep. 1996.

Nguyen et al., "Virtual Systems: Aspects of the Air-Mobile Ground Security and Surveillance System Prototype," Unmanned Systems, vol. 14, No. 1, 11 pages, Winter 1996.

Notification of the First Office Action, dated Mar. 30, 2012, Chinese Patent Application 200980114885.5, The State Intellectual Property Office of the People's Republic of China, 7 pages (English language translation appended).

Notification of the Third Office Action, dated Feb. 25, 2013, Chinese Patent Application 200980114885.5, The State Intellectual Property Office of the People's Republic of China, 7 pages (English language translation appended).

Snavely et al., "Photo tourism: Exploring Photo Collections in 3D," ACM Transactions on Graphics (SIGGRAPH Proceedings), 25(3), 2006, pp. 835-846.

Tanikawa et al., "Building a photo-realistic virtual world using view-dependent images and models," IEEE, 1999, pp. VI-98 to VI-103.

The State Intellectual Property Office of the People's Republic of China, "Notification of the Second Office Action," Appln. No. 200980114885.5, dated Sep. 12, 2012, pp. 1/52-10/52 (English language translation provided—pp. 1-15).

Web Archive Capture (Feb. 26, 2008), http://phototour.cs.washington.edu/, retrieved on Jun. 22, 2022, 2 pages.

Wei et al., "A Panoramic Image-Based Approach to Virtual Scene Modeling", The Proceedings of the Multiconference on "Computational Engineering in Systems Applications", Oct. 4-6, 2006, Beijing, China, pp. 1449-1453.

Wei et al., "Color Anaglyphs for Panorama Visualizations," Communication and Information Technology Research Technical Report ("CITR-TR"), No. 19, pp. 2-15, Feb. 1998.

Wikipedia, "QuickTime VR," Nov. 7, 2007, https://en.wikipedia.org/wiki/QuickTime_VR on Jun. 22, 2022, 5 pages.

Zheng et al., "Panoramic Representation for Route Recognition by a Mobile Robot," International Journal of Computer Vision, 9:1, Kluwer Academic Publishers, The Netherlands, 1992, pp. 55-76.

Zheng et al., "Panoramic Representation of Scenes for Route Understanding," IEEE, 1990, pp. 161-167.

\* cited by examiner

SYSTEM AND METHOD OF INDICATING THE DISTANCE OR THE SURFACE OF AN IMAGE OF A GEOGRAPHICAL OBJECT

PRIORITY CLAIM

The present application is a continuation of U.S. application Ser. No. 15/292,226 having a filing date of Oct. 13, 2016, issued as U.S. Pat. No. 11,157,129, which is a continuation of U.S. application Ser. No. 12/415,102 filed Mar. 31, 2009, issued as U.S. Pat. No. 9,477,368. Applicant claims priority to and the benefit of each of such applications and incorporate all such applications herein by reference in its entirety.

BACKGROUND OF THE INVENTION

Services such as Google Maps are capable of displaying street level images of geographic locations. These images, known on Google Maps as "Street View", typically comprise photographs of buildings and other features, and allow a user to view a geographic location from a person's perspective as compared to a top-down map perspective.

When displayed on a monitor, a user may interact with an image by manipulating a cursor and 3D objects displayed on the image. For example, Google Maps often draws a yellow line corresponding with a street on the image; the line is drawn as if it were painted on the street. When the user moves the cursor to an arrow on the yellow line, and clicks the arrow, the image may change to a nearby street level image taken from a different perspective or location. However, even though the cursor may be used to change or otherwise interact with the street level image, the cursor itself does not convey information about the street level image itself.

BRIEF SUMMARY OF THE INVENTION

In one aspect of the invention, a method of displaying images is provided. The method includes: receiving an image representing a geographical object captured by a camera at a camera position; receiving surface data representing a surface of the geographical object and the distance of the surface relative to the geographical object; displaying the image on an electronic display; receiving a screen position, where the screen position identifies a position on the image relative to the display; selecting, with a processor, surface data depending on whether the screen position corresponds with the location of the surface within the image; determining, with a processor, a visual characteristic of a cursor based on the selected surface data and the distance of the surface; and displaying the cursor with the visual characteristic on the electronic display.

Another aspect provides a method of displaying images that includes: receiving an image representing a geographical object captured by a camera at a camera position; displaying the image on an electronic display; receiving distance data representing the distance between a surface of the geographical object and the camera position; receiving a screen position, where the screen position identifies a position on the image relative to the display; selecting, with a processor, distance data depending on whether the screen position corresponds with the location of the surface within the image; determining, with a processor, a visual characteristic of a cursor based on the selected distance data; and displaying the cursor with the visual characteristic on the electronic display.

Yet another aspect provides a method of displaying images that includes: receiving an image representing a geographical object captured by a camera at a camera position; receiving distance data representing the distance between a surface of the geographical object and the camera position; displaying the image on an electronic display; receiving orientation data representing the orientation of the surface relative to the camera angle; receiving a screen position, where the screen position identifies a position on the image relative to the display; selecting, with a processor, distance data and orientation data depending on whether the screen position corresponds with the location of the surface within the image; determining, with a processor, a visual characteristic of a cursor based on the selected distance data and orientation data; and displaying the cursor with the visual characteristic on the electronic display.

Still another aspect provides a system having a variety of components including a user input device; a memory storing instructions, image data representing geographic objects captured by a camera, and data representing the position of those surfaces of the objects that are facing the camera; a processor in communication with the user input device so as to process information received from the user input device in accordance with the instructions; and a display in communication with, and displaying information received from, the processor. The instructions include determining a position on the image based on information received from the user input device, determining the surface of the object at said position of the image, determining a shape and size based on the data representing the position of said surface relative to distance to the viewpoint of the image, and displaying, on the display, the determined shape at the determined size.

A further aspect relates to a method of method of displaying images comprising: receiving an image representing a plurality of geographical objects captured by a camera at a camera position; receiving distance data representing the distance between the geographical objects and the camera position; receiving a screen position, where the screen position identifies a position on the image relative to the display; displaying, on an electronic display, the image; selecting, with a processor, distance data associated with one of the plurality of geographical objects depending on whether the screen position corresponds with the location of the geographical object within the image; determining, with a processor, a visual characteristic of a cursor based on the selected distance data; and displaying the cursor with the visual characteristic.

DETAILED DESCRIPTION

In one aspect, the system and method displays cursors for street level images, where the cursor appears to lie flat against the objects in the image and changes based on the user's manipulation of a mouse, keyboard or other navigation method. The size of the cursor also changes based on the distance of an object under the cursor to the camera position. This and other aspects are described below.

Figure 1:
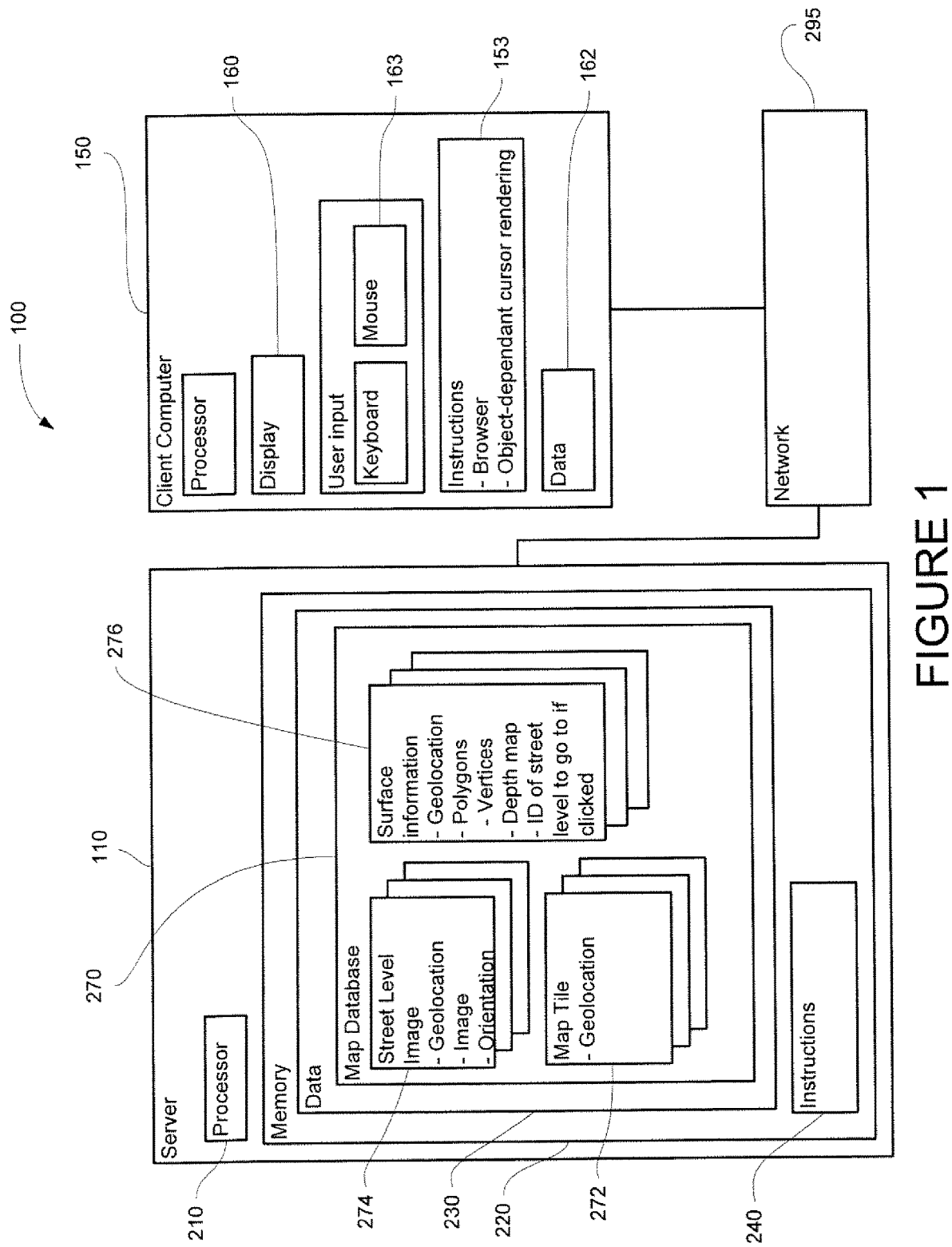
FIG. 1 is a functional diagram of a system in accordance with an aspect of the invention.
Figure 2:
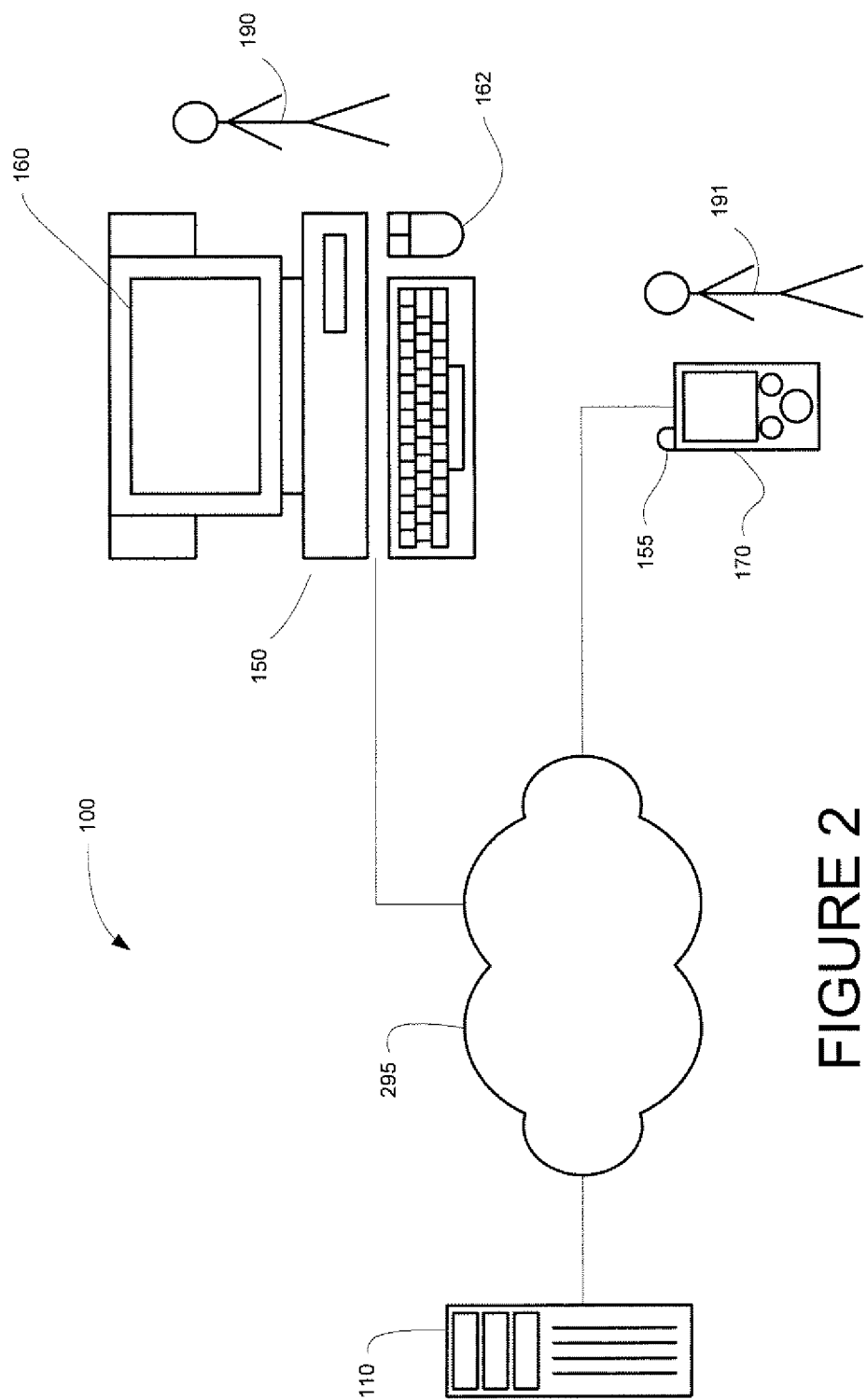
FIG. 2 is a pictorial diagram of a system in accordance with an aspect of the invention.

As shown in FIGS. 1-2, a system 100 in accordance with one aspect of the invention includes a computer 110 containing a processor 210, memory 220 and other components typically present in general purpose computers.

Memory 220 stores information accessible by processor 210, including instructions 240 that may be executed by the processor 210. It also includes data 230 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 210 may be any well-known processor, such as processors from Intel Corporation or AMD. Alternatively, the processor may be a dedicated controller such as an ASIC.

The instructions 240 may be any set of instructions to be executed directly (such as machine code) or indirectly (such as scripts) by the processor. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance. Functions, methods and routines of the instructions are explained in more detail below.

Data 230 may be retrieved, stored or modified by processor 210 in accordance with the instructions 240. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information which is used by a function to calculate the relevant data.

Although the processor and memory are functionally illustrated in FIG. 1 within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, computer 110 is a server communicating with one or more client computers 150, 170 (only client 150 being shown in FIG. 1 for clarity). Each client computer may be configured similarly to the server 110, with a processor, memory and instructions. Each client computer 150, 170 may be a personal computer, intended for use by a person 190-191, having all the internal components normally found in a personal computer such as a central processing unit (CPU), display device 160 (for example, a monitor having a screen, a projector, a touch-screen, a small LCD screen, a television, or another device such as an electrical device that is operable to display information processed by the processor), CD-ROM, hard-drive, user input (for example, a mouse 163, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, and set-top boxes for televisions.

Although the client computers 150 and 170 may comprise a full-sized personal computer, many aspects of the system and method are particularly advantageous when used in connection with mobile devices capable of wirelessly exchanging data with a server over a network such as the Internet. For example, client computer 170 may be a wireless-enabled PDA such as a Blackberry phone or an Internet-capable cellular phone. In either regard, the user may input information using a small keyboard (in the case of a Blackberry phone), a keypad (in the case of a typical cell phone), a touch screen (in the case of a PDA) or any other means of user input.

Client computers 150 and 170 may include a component, such as circuits, to determine the geographic location of the device. For example, mobile device 170 may include a GPS receiver 155. By way of further example, the component may include software for determining the position of the device based on other signals received at the mobile device 150, such as signals received at a cell phone's antenna from one or more cell phone towers if the mobile device is a cell phone.

The server 110 and client computers 150 and 170 are capable of direct and indirect communication, such as over a network 295. Although only a few computers are depicted in FIGS. 1-2, it should be appreciated that a typical system can include a large number of connected computers, with each different computer being at a different node of the network 295. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP. Such communication may be facilitated by any device capable of transmitting data to and from other computers, such as modems (e.g., dial-up or cable), networks and wireless interfaces. Server 110 may be a web server.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

Map database 270 of server 110 stores map-related information, at least a portion of which may be transmitted to a client device. For example, map database 270 may store map tiles 272, where each tile is a map image of a particular geographic area. Depending on the resolution (e.g., whether the map is zoomed in or out), one tile may cover an entire region, such as a state, in relatively little detail. Another tile may cover just a few streets in high detail.

The map information is not limited to any particular format. For example, the images may comprise street maps, satellite images, or a combination of these, and may be stored as vectors (particularly with respect to street maps) or bitmaps (particularly with respect to satellite images). The various map tiles are each associated with geographical locations, such that the server 110 is capable of selecting, retrieving and transmitting one or more tiles based on a receipt of a geographical location, which may be a single point, a range, or some other indication.

The map database may also store street level images 274. Street level images comprise images of objects captured by cameras at particular geographical locations in a direction roughly parallel to the ground. For example, a single street level image may show a perspective view of a street and its associated buildings, taken at a position a few feet above the ground (e.g., from a camera mounted on top of a vehicle, and at or below the legal limit for typical vehicles in certain states (e.g., 7-14 feet)) and in a direction generally parallel to the ground (e.g., the camera view was pointed down the street into the distance). Street level images are not limited to any particular height above the ground, for example, a street level image may be taken from the top of building.

In one aspect of the system and method, the street level images are panoramic images, such as 360° panoramas centered at the geographic location associated with the image. The panoramic street-level view image may be created by stitching together a plurality of photographs representing different perspectives from a geographical vantage point. In other aspects, only a single street level image pointing in a particular direction may be available at any particular geographical location. The street level images are thus typically associated with both a geographical location and information indicating the orientation of the image. For example, each image may be associated with both a latitude and longitude, and data that allows one to determine which portion of the image corresponds with facing north, south, east, west, northwest, etc.

Street level images may also be stored in the form of videos, such as by displaying MPEG videos captured by an analog video camera or displaying, in succession, time-sequenced photographs that were captured by a digital still camera.

Figure 3:
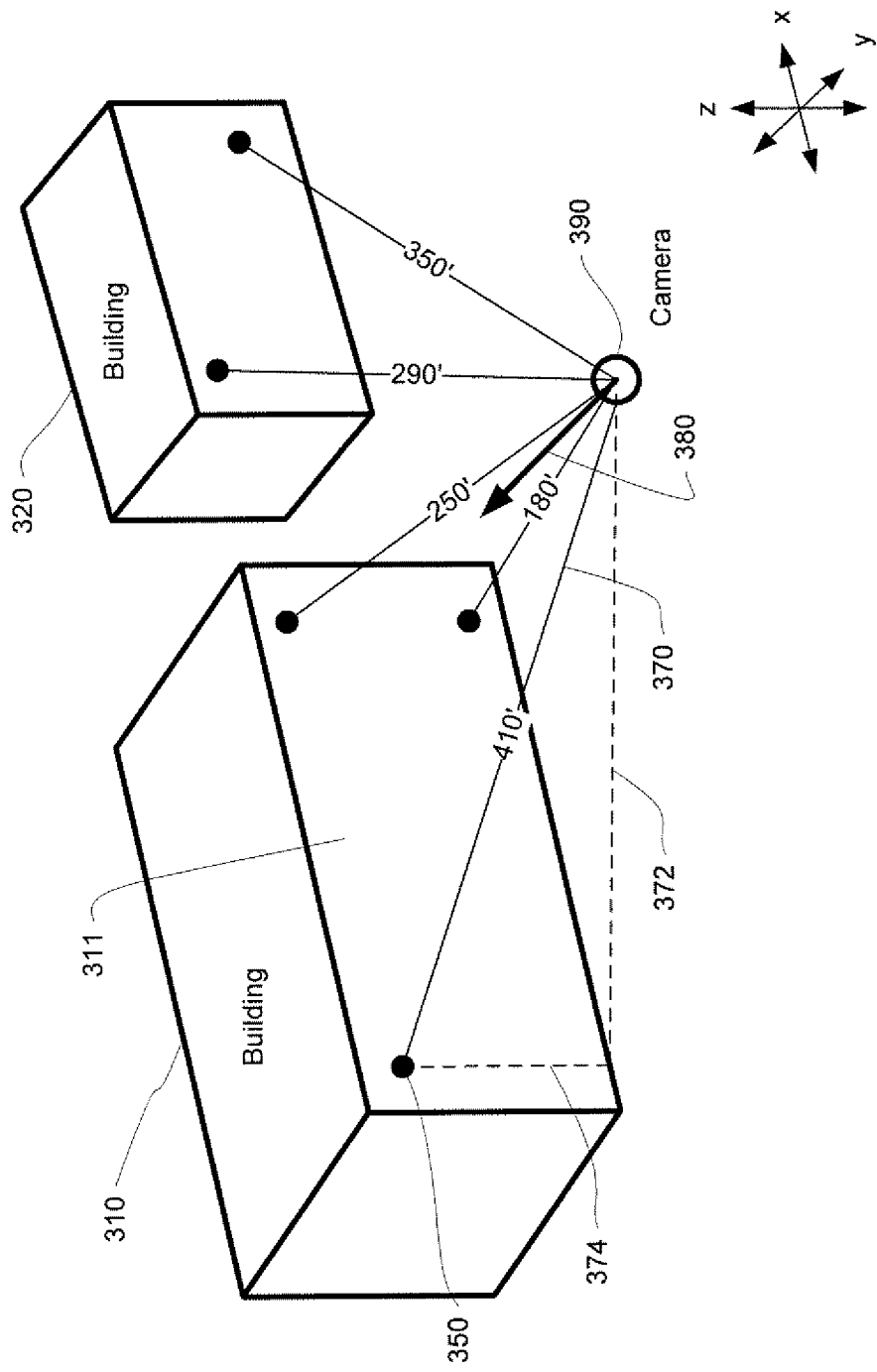
FIG. 3 is a functional diagram of data representing the surfaces of buildings in a street level image.

Memory 220 may also store surface information 276 describing the outer surface of objects in the street level images. By way of example only, each street level image may be associated with information describing the proximity of the objects' surface to the camera. For example, FIG. 3 shows two buildings 310 and 320 that may appear in a street level image. In that regard, each surface may be represented as collection of points. Each point, in turn, may be represented as a vector, whereby each point is stored with respect to its distance to the camera, and its angle with respect to the direction in which the camera is pointed. Thus, point 350 of surface 311 of building 310 may be defined by its distance 370 from the camera and its angles along the ground 372 (the x-y direction) and height 374 (the z-direction) relative to the direction 380 in which the camera 390 is pointed. Such information may be collected by using a laser range finder in combination with the camera taking the street level images.

Figure 4:
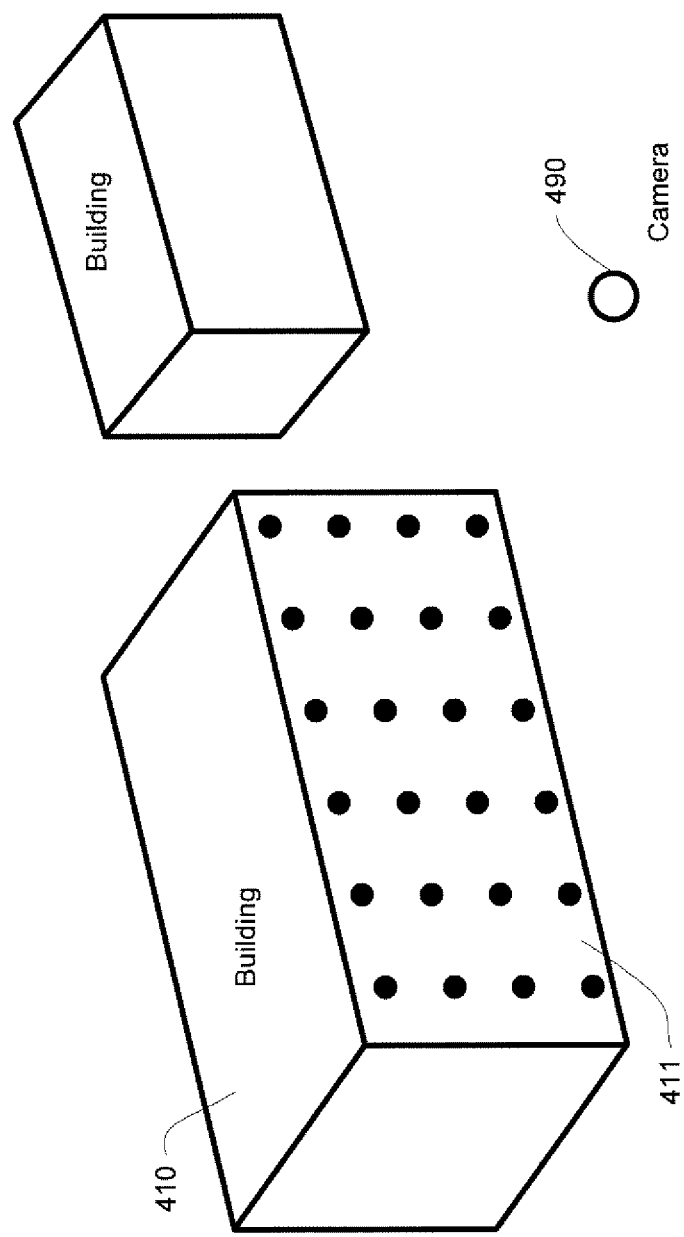
FIG. 4 is a functional diagram of data representing the surfaces of buildings in a street level image.

Although some formats may be more advantageous than others, the system and method is not limited to any particular format of storing the surface information. For example, as shown in FIG. 4, if the latitude, longitude and altitude of the camera 490 are known, the surface of 411 of building 410 may be stored as collection of points (shown as black dots) each having an associated latitude, longitude and altitude. The surface data may thus represent a cloud of 3D points positioned in space relative to a reference point.

Such surface data may be sent from a server to a client as a grid of discrete values, where each element of the grid corresponds with a pixel of a street level image. If so, the value of the depth map at each pixel may represent the distance from the camera position to the portion of the geographic object shown at that pixel.

Yet another format stores the objects in the street level image as 3D models. By way of example only and shown in FIG. 5, rather than storing collections of points, the facades and other surfaces of the buildings may be represented as rectangles, triangles or other shapes defined by vertices having positions in space, such as latitude, longitude and altitude. Thus, front facade 511 of building 510 may be represented as a rectangular plane having four points 551-554, with each point defined in an (x,y,z) format (such as latitude, longitude, altitude). Similarly, side facade 512 may be represented as a rectangular plane defined by four points 553-556, two of which are shared with the front facade 511. Accordingly, the buildings and other objects that may be present in a street level image may also be stored as 3D models comprising polygons.

Still another format stores the objects as a set of planes corresponding with the object surfaces facing the camera that captured the street level image. Each plane may be associated with a unique index number, and the vertex of each plane may be defined in an (x,y,z) format (such as latitude, longitude, altitude). The data defining the planes may also associate each pixel of the street level image with one of the planes. Thus, instead of defining the distance between the camera and the object represented at the pixel, the value would represent the index of the plane representing the object surface at that pixel. Representing surfaces in this fashion may permit a processor to quickly retrieve and determine the position and orientation of each surface at each pixel of a street level image. Pixels that are not associated with a surface may be associated with a null or default surface value.

Figure 5:
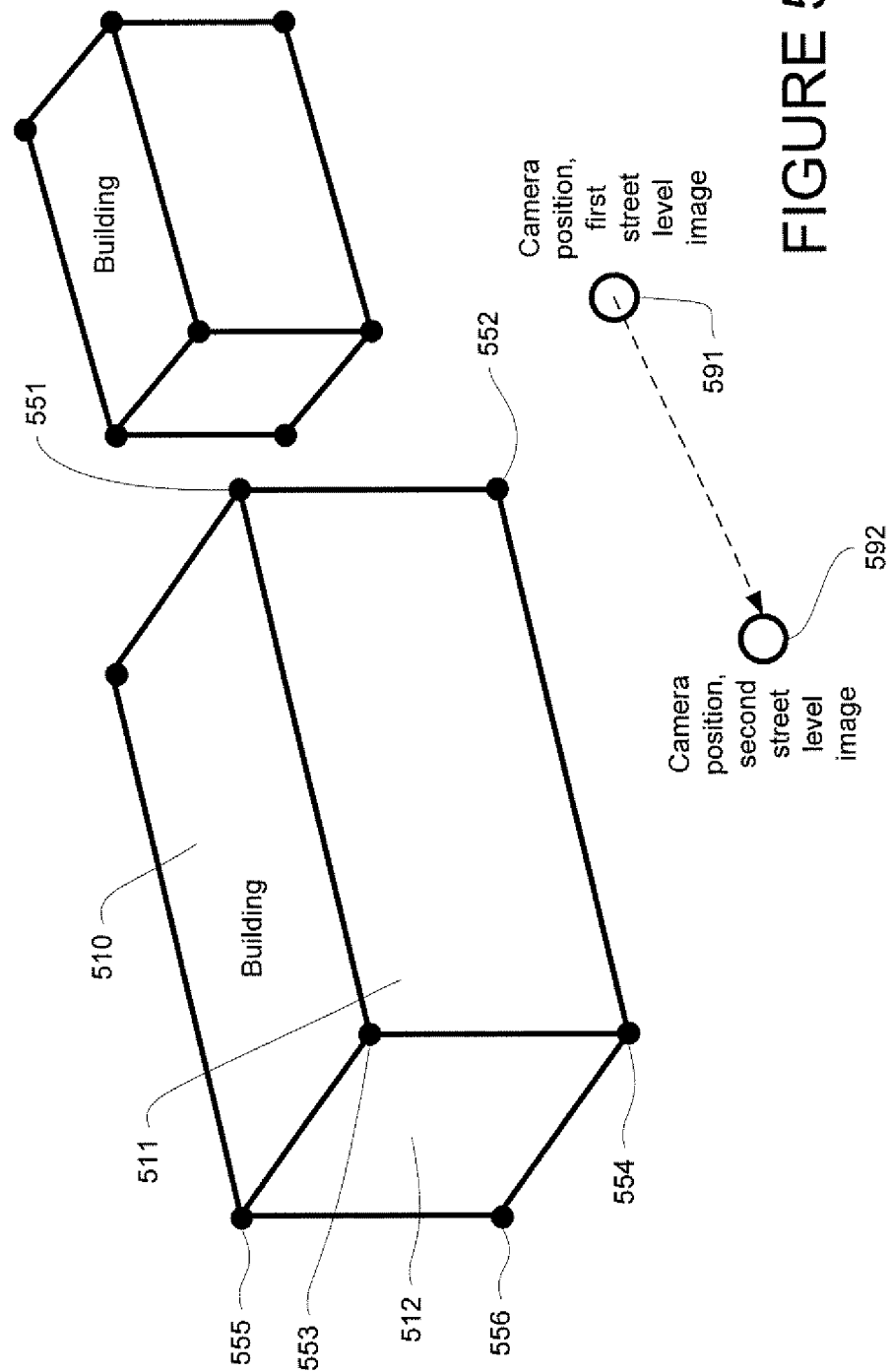
FIG. 5 is a functional diagram of data representing the surfaces of buildings in a street level image.

Many of the formats permit the surface information to be stored independently of the street level images taken by the camera. As shown in FIG. 5, if the building surfaces are stored as 3D models relative to the latitude and longitude of the earth, the data associated with the 3D model of building 510 does not change regardless of whether the camera view of the building is at first position 591 or second position 592. Accordingly, in some formats, the surface information may be stored without regard to a particular street level image.

A variety of systems and methods may be used to collect the surface information. By way of example only and as noted above, a laser range finder may be used. In addition, stereoscopic systems employing two video cameras, spaced slightly apart yet looking at the same scene, may be used as well; by analyzing the slight differences between the images seen by each camera, it is possible to determine the distance at each point in the images. In yet another aspect, the information may be compiled by using a single video camera, travelling at a particular velocity, to capture the street level imagery as the scenery passes by. The video may not only be used and shown as the street level image, but subsequent frames may be compared to extract the different distances between the objects and the camera (e.g., mountains in the distance will stay in the frame much longer than a fire hydrant passing by along the street).

Figure 14:
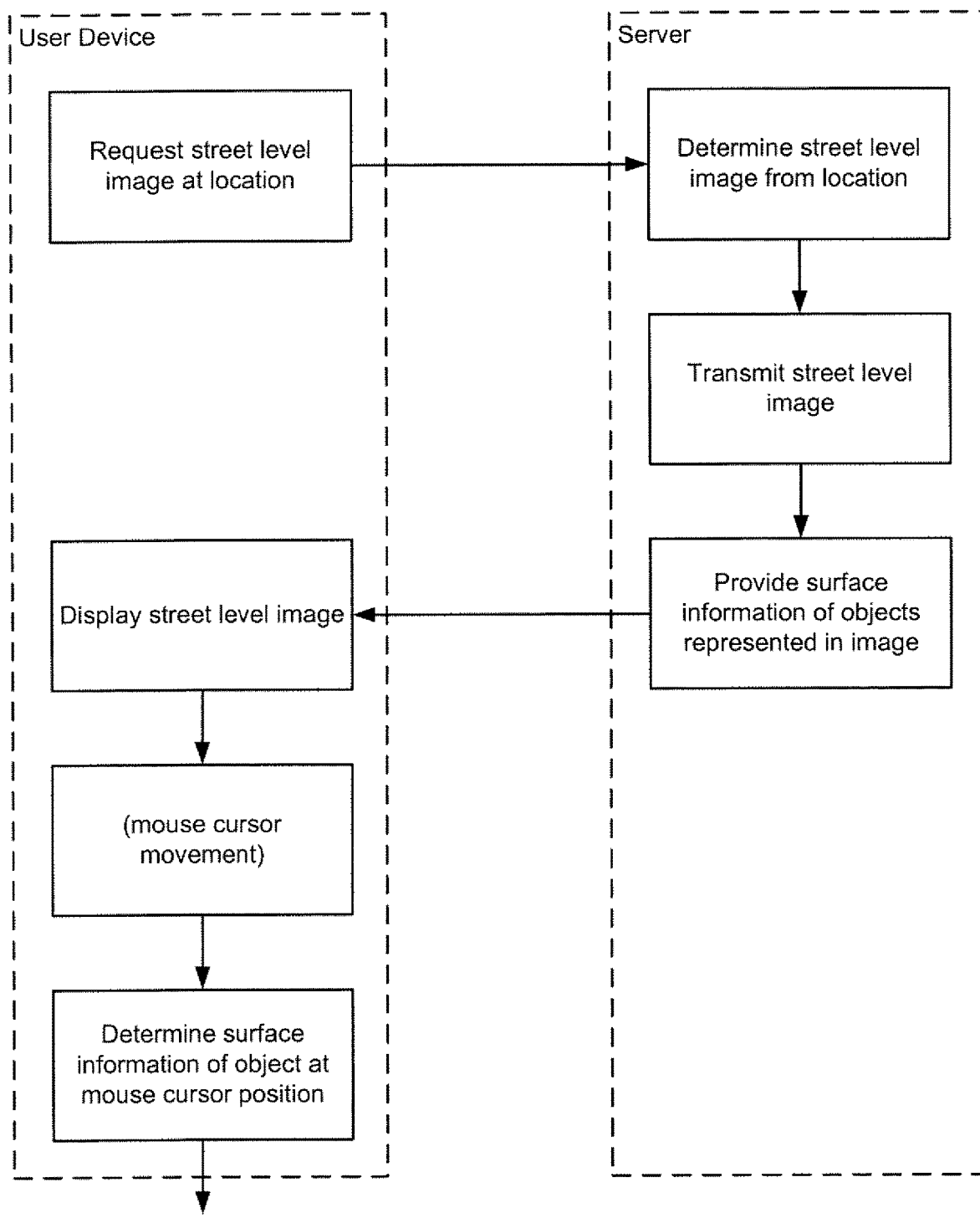
FIG. 14 is a flowchart in accordance with an aspect of the invention.
Figure 15:
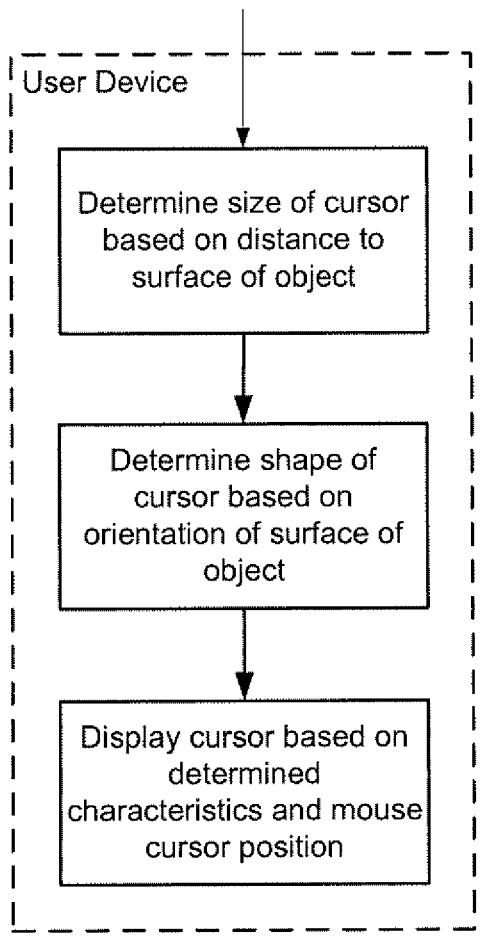
FIG. 15 is a flowchart in accordance with an aspect of the invention.

In addition to the operations illustrated in FIGS. 14-15, various operations in accordance with a variety of aspects of the invention will now be described. It should be understood that the following operations do not have to be performed in the precise order described below. Rather, various steps can be handled in reverse order or simultaneously.

Figure 6:
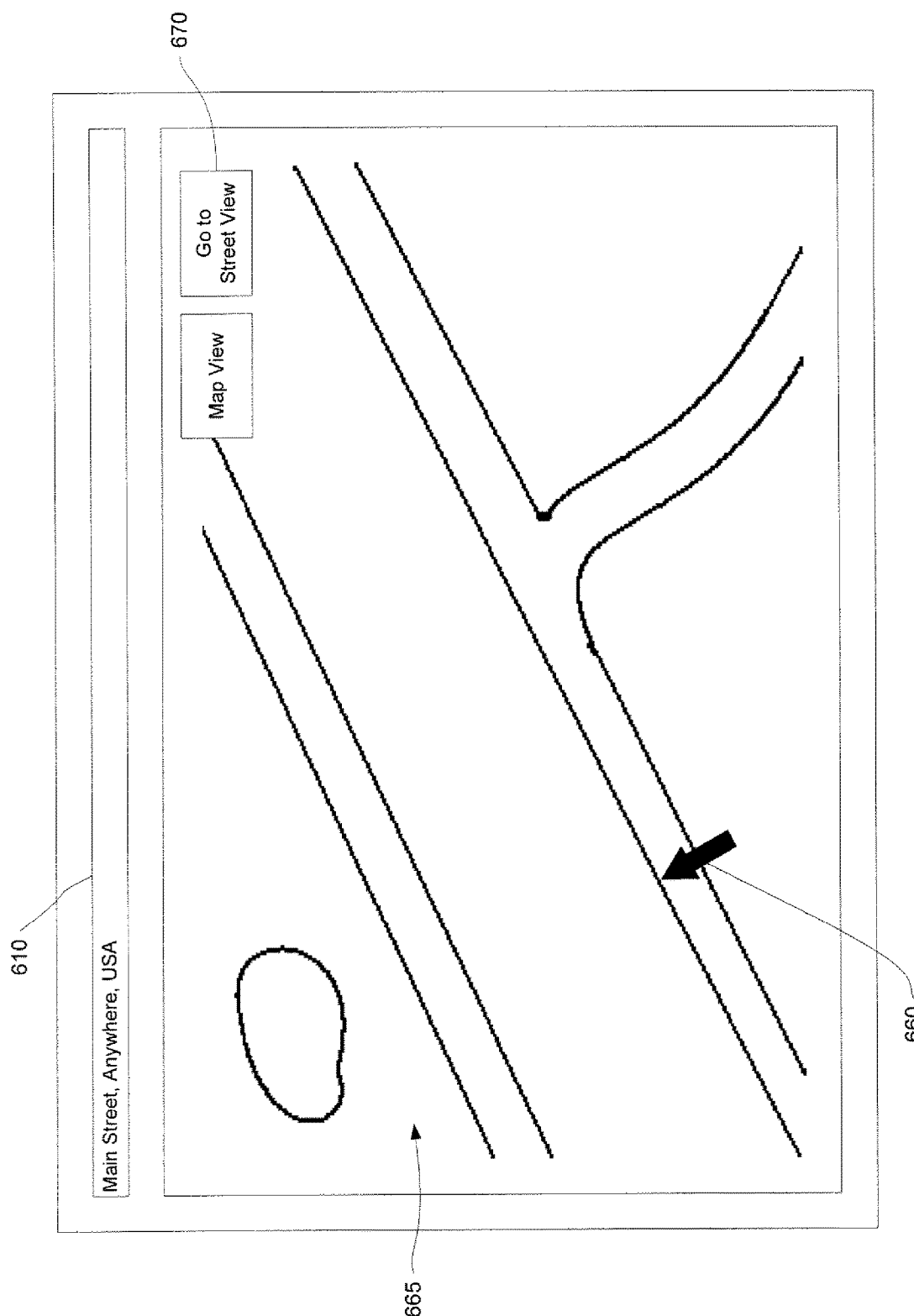
FIG. 6 is a screen shot in accordance with an aspect of the invention.

FIG. 6 illustrates a screen shot of a map displayed by the display device at the client computer from a top-down perspective. For example, the system and method may be implemented in connection with an Internet browser such as Google Chrome (not shown) displaying a web page containing a map 665 and other information. The program may provide the user with a great deal of flexibility when it comes to both identifying a location to be shown in a street level view and requesting the street level image. For example, the user may enter information such as an address, the name of building, latitude and longitude, or some other information that identifies a particular geographical location in text box 610. The user may further use a mouse or keypad to move a cursor 660 to identify the particular geographical location of the street level image. Yet further, the program may provide a button 670 or some other feature that allows a user to request a street level view at the specified geographical location.

Figure 7:
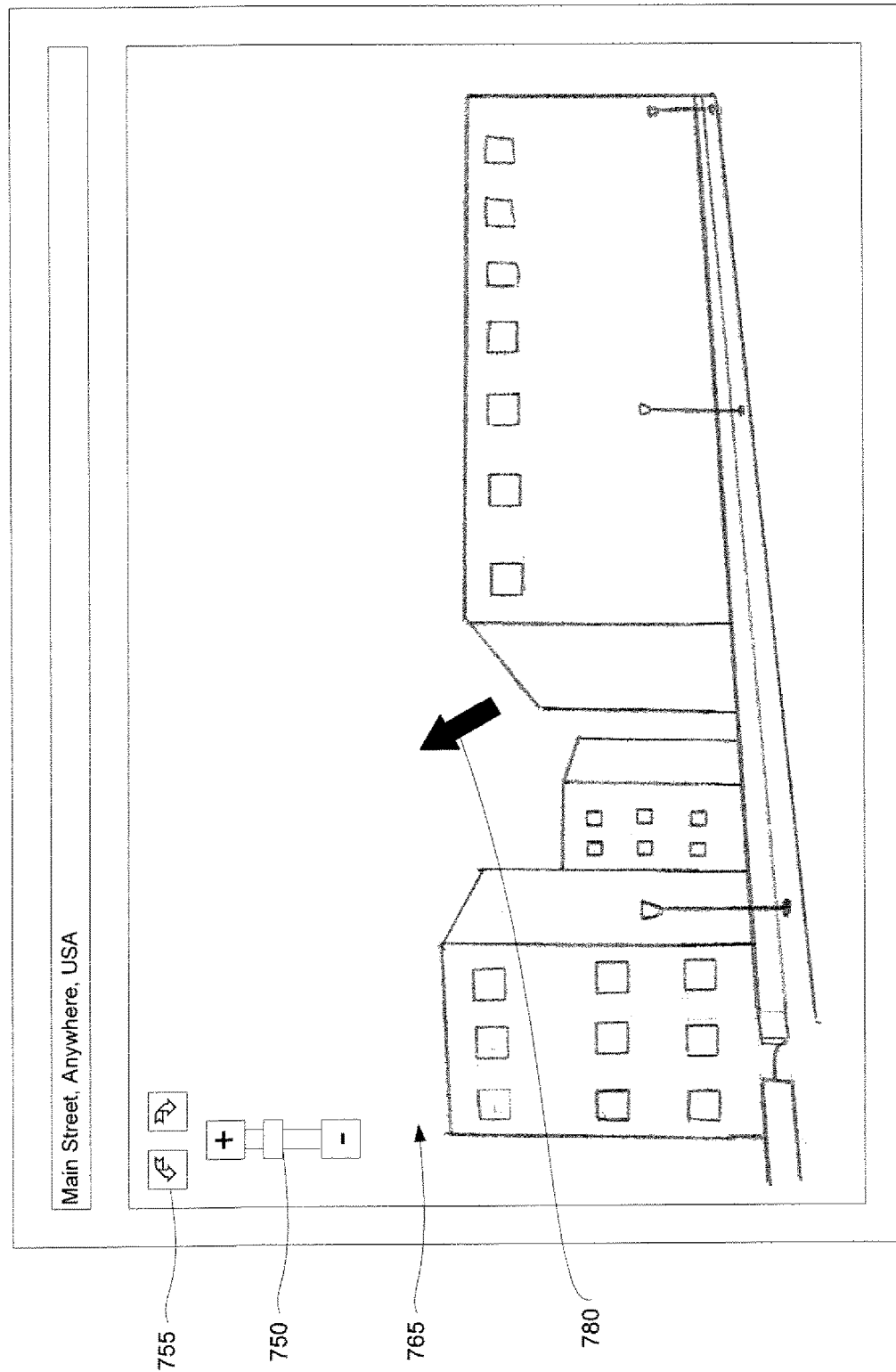
FIG. 7 is a screen shot in accordance with an aspect of the invention.

Upon the user requesting an image from a street level viewpoint at a particular geographical location, server 110 retrieves the appropriate street level image based on the requested location. For example, if the street level images are stored based on the latitude/longitude coordinates of the camera that captured the image, the closest image to the requested latitude/longitude will be retrieved. The street level image is displayed as shown in FIG. 7 on the display device 160 of client computer 170. As noted above, the image may be a bitmap of a picture taken by a camera at the requested geographical location. As shown in FIG. 7, the image may show only one direction, such as north, east, southwest, etc. Alternatively, the image may show a portion of a 360° panoramic image wrapping around the geographical location, such as the portion of the panoramic image that corresponds with the desired orientation.

FIG. 7 illustrates just one possible street level image 765 representing geographic objects such as buildings, walls, streets, and lamp posts. Any other objects at geographic locations may also be represented by the image data.

As shown in FIG. 7, the street level image 765 may be shown in the browser along with controls 750 for zooming the image and controls 755 for changing the location or direction of the viewpoint (such as the camera angle). In accordance with the instructions, operation of controls 750 or 755 will change the image 765 being displayed by using the information that was already received from the server (such as by using a different portion of the received image if an entire 360° panorama was received) or retrieving additional information (such as by requesting another image if the user wants to view a scene looking east from the location and the received image only shows the scene looking north from the location). Other navigation controls may be included as well, such as panning controls in the form of arrows disposed along the street. Such arrows may be selected by a user (by clicking or by dragging along the street line) to change the vantage point from up or down the street.

The display device may also display a cursor. As is well known, users can identify positions on a screen by operating user devices such as moving a computer mouse, pressing arrow keys on a keyboard, or tapping a touch-sensitive screen. By way of example, the mouse may provide information indicating how much the position should change and a touch-sensitive screen may provide information regarding what the position should be. Hereafter, references to "screen position" means a position relative to the display device. By way of example only, the screen position of a monitor may be a position on the screen of the monitor relative to the screen's top-left corner. The screen position on a PDA with a fixed screen may be a position on a touch-screen of a PDA relative to the center of the device. Yet further, a screen position may refer to a position on a movie screen that is displaying images projected by a projector, or any other location on any other article that is capable of displaying information that changes in response to instructions.

If the user uses a mouse to select the screen position, the selected position may be identified by displaying a mouse cursor 780 at the particular screen position. A display may show more than one cursor at more than one screen position. For example, a display may simultaneously display both an arrow-shaped mouse cursor identifying a screen position selected by a mouse, and an I-beam shaped text cursor identifying a screen position selected by a keyboard.

In one aspect of the invention, surface information 276 is retrieved along with the street level image. For example, if the surface information of objects in the street level image view 765 are stored as 3D models comprised of multiple polygons (hereafter, "object models") as figuratively shown in FIG. 8, the object models 810, 820, 830-833 within a particular distance of the geographical location 890 of the street level image are sent to the client. Optionally, only those objects that lie in the direction of the camera direction 891 may be transmitted, such as building models 810, 820 and 830 and wall 831. (Though not intended to be to scale, models 810, 820 and 830 correspond with buildings 910, 920 and 930 in FIG. 9.)

Figure 9:
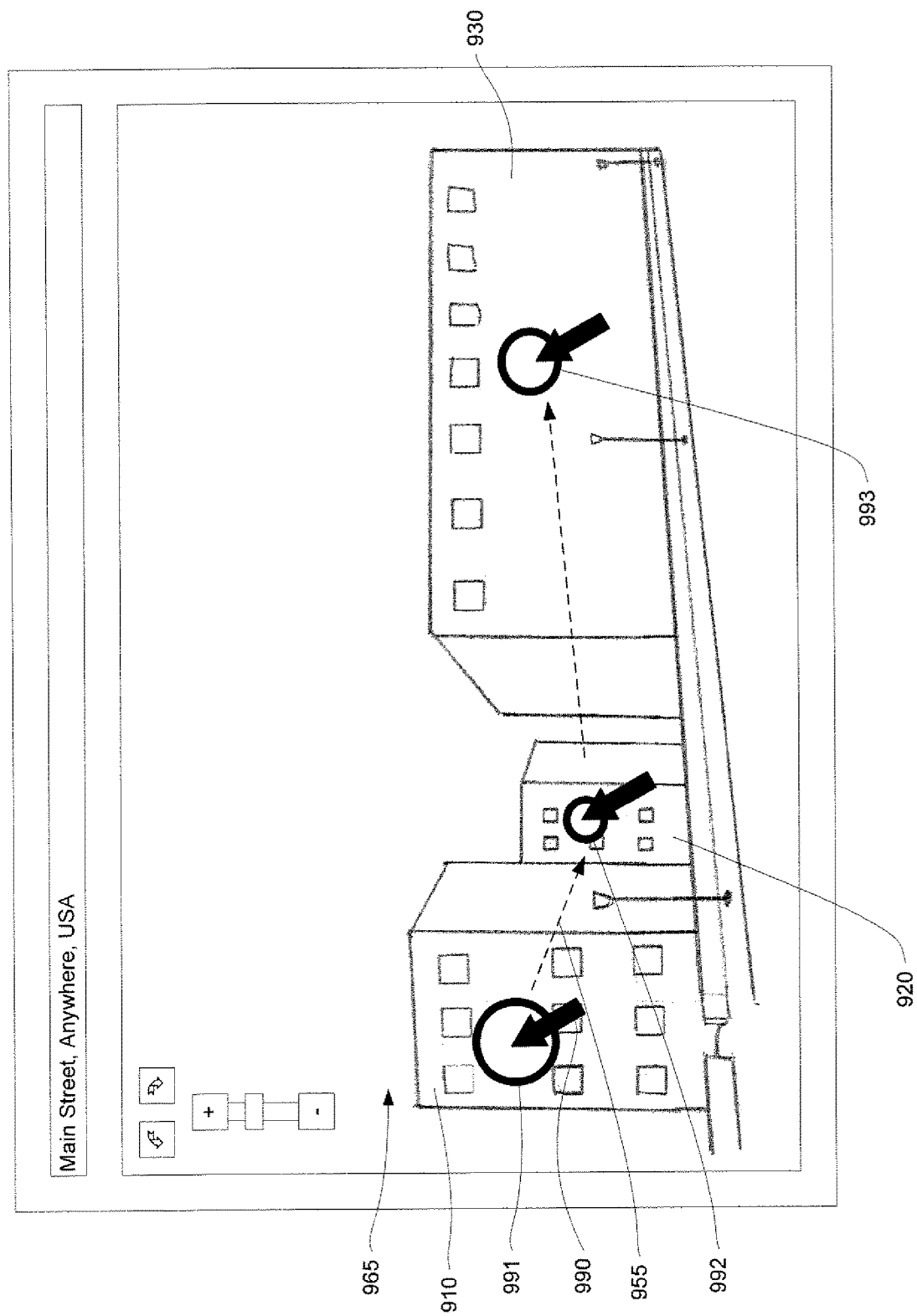
FIG. 9 is a screen shot in accordance with an aspect of the invention.

As shown in FIG. 9, a user may move a mouse cursor 990 across the street level image 965 by manipulating the mouse associated with the client computer (or by manipulation of other user input devices).

In one aspect of the system and method, the processor displays a cursor whose position on the street level image corresponds with a user-selected screen position and whose shape depends on the position of the objects shown in the street level image.

For example, when positioned over an object (such as a building) in the street level image, the object-dependant cursor may be a circle whose diameter changes based on object's distance from the camera. As shown by example in FIG. 9, if the user has moved mouse cursor 990 to a screen position that is over building 910, the processor may display a circle 991 at the same screen position. The diameter of the circle may be 30 pixels wide.

When the user moves the mouse cursor over another object, such as building 920, the diameter of the circle will change if the object is closer or farther away than building 910. For example, when the screen position of the mouse cursor is moved in direction 955 from the facade of building 910 to building 920, which is behind building 920 based on the current camera position and angle, the diameter of the circular object-dependant cursor may change from 30 pixels to 15 pixels (as represented by circle 992). The smaller size indicates that the newly pointed-to object is further away. If the screen position is changed yet again to where building 930 is being displayed on the screen, the cursor may again change size again to 20 pixels (assuming the front of building 930 is closer to the camera in the street level image than building 920 but farther than building 910). The size changes may be proportionally associated, directly or exponentially or otherwise, with the changes in the distance from the camera position or other viewpoint from which the objects are currently being viewed.

The system and method is not limited to any particular method of determining the closest object surface that corresponds with the screen position within the displayed street level image. For example, if the surface information is expressed in terms of 3D objects, the closest surface may be determined by use of ray tracking. The length of the ray would indicate the size of the object-dependant cursor, e.g., the longer the ray the smaller the cursor. Ray tracing may be particularly effective when used to determine the surfaces of objects at the poles of spherical panoramas. Other methods, such as scan conversion and z-buffering, may also be used. Yet further, if the surface data is sent as a 2-D array of distance values for each pixel, the appropriate distance data may be quickly retrieved by determining the position of the pixel in the image that is being pointed at by the mouse cursor.

Figure 10:
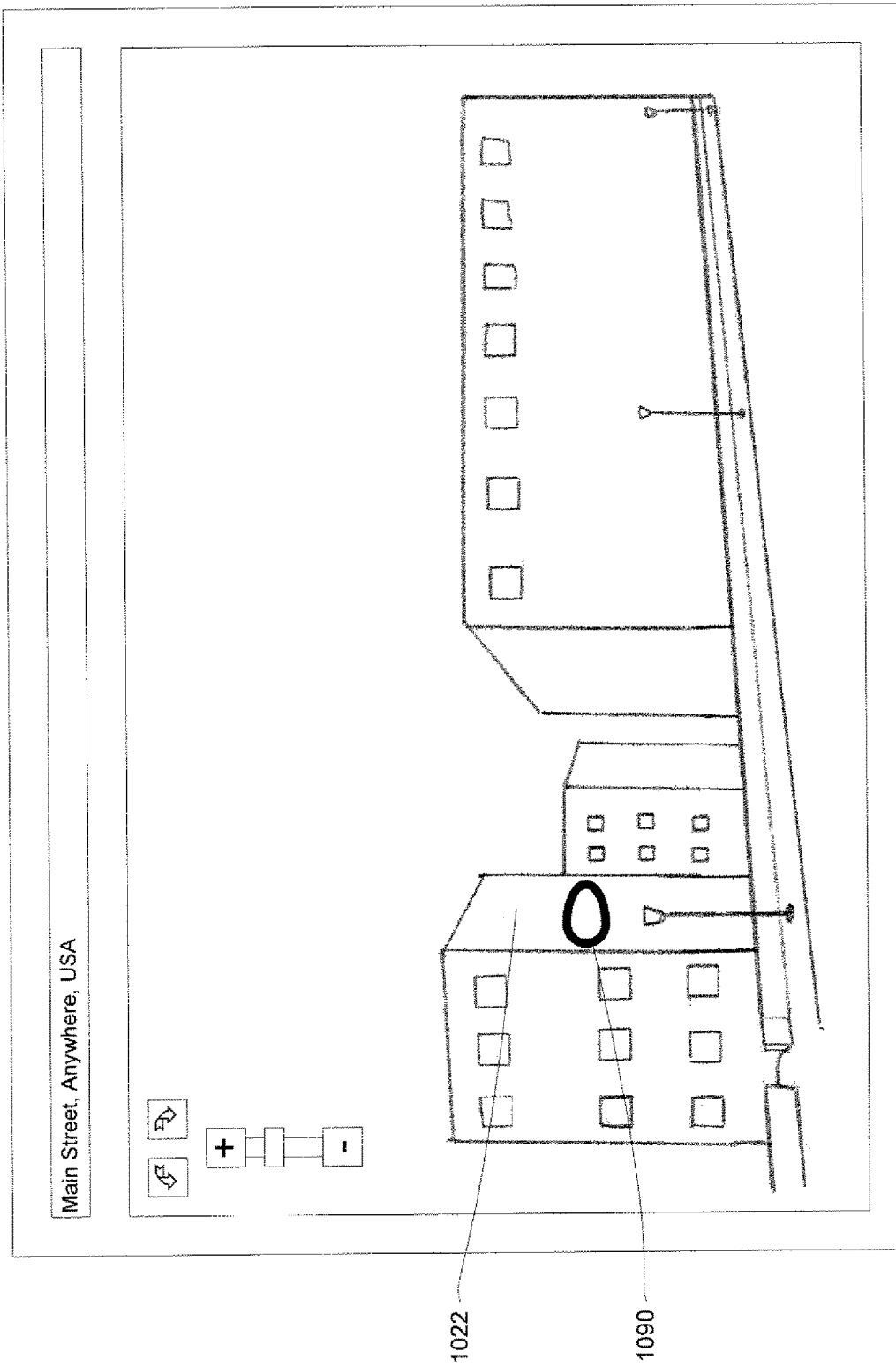
FIG. 10 is a screen shot in accordance with an aspect of the invention.

In yet another aspect, the shape of the object-dependant cursor may be deformed to appear as if it is lying on the surface. For example, as shown in FIG. 10, if building side 1022 is not squarely facing the camera but rather angled towards it, and if the circle-shaped cursor is intended to give the impression of lying on the side of the building, the cursor will not be drawn as a circle (as far as the boundaries of the screen are concerned). Rather, to convey the impression of lying against the building, the shape of the cursor is angled (to conform with the angle of the building) and stretched (to conform with the building stretching into the distance).

In that regard, in one aspect of the invention, circle-shaped object-dependant cursors may be shown as stretched ellipses 1090 when pointing to surfaces that are angled with respect to the camera. Other shapes could be similarly deformed to appear as if they are lying flat on an angled surface, such as drawing square-shaped object-dependant cursors on surfaces that directly face the camera and drawing trapezoid-shaped object-dependant cursors on surfaces that have an orientation angling away from the camera and into the distance.

Figure 11:
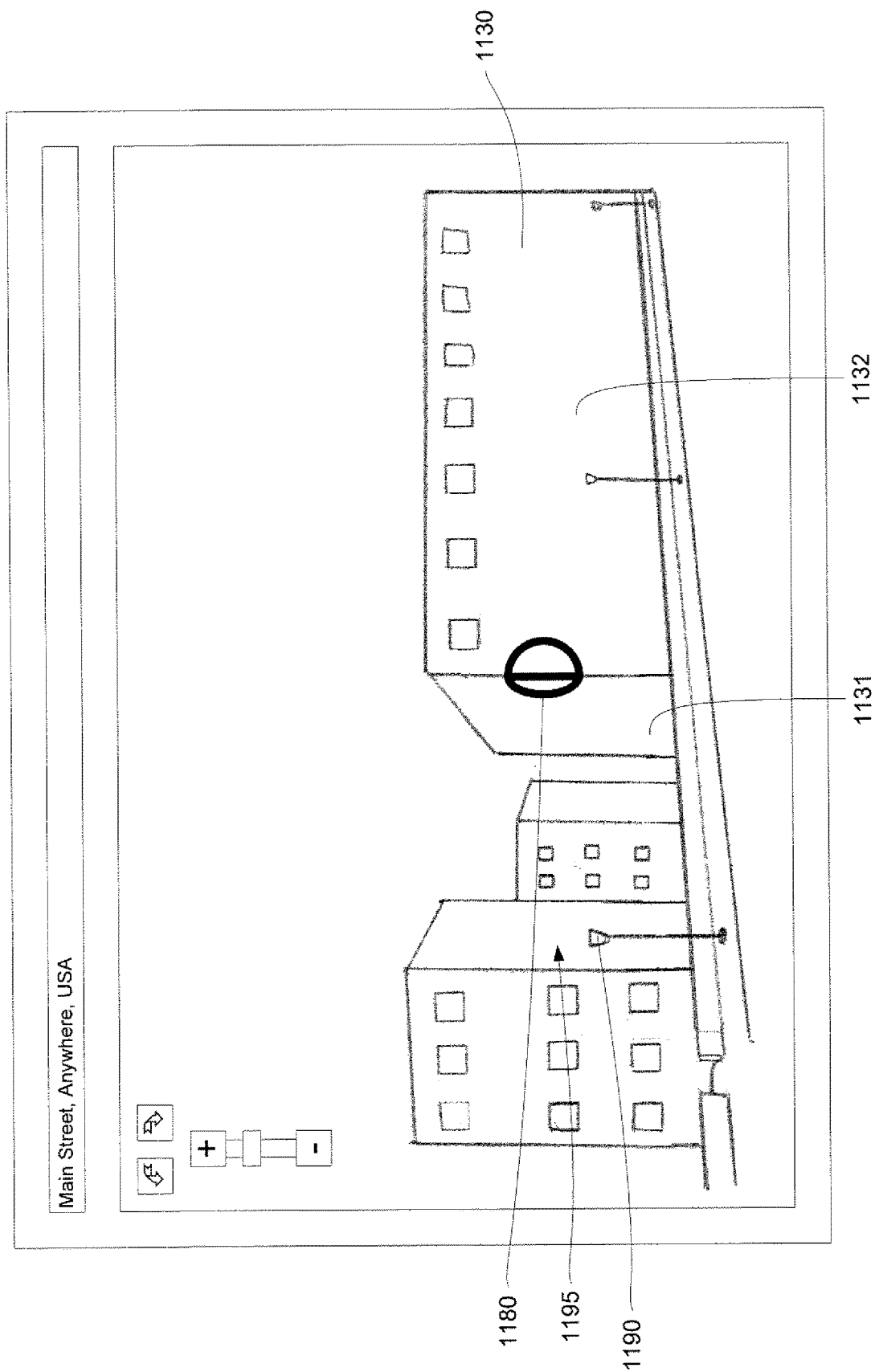
FIG. 11 is a screen shot in accordance with an aspect of the invention.

The object-dependant cursor may also wrap around objects. As shown in FIG. 11, the width and screen position of the object-dependant cursor 1180 may cause it to overlap with two different surfaces, namely front 1131 and side 1132 of building 1130. Accordingly, a portion of the cursor 1180 may be drawn flat against the front 1131 and another portion against the side 1132 of the building. Again, in this aspect, it is intended that the object-dependant cursor appear to lie flat against the object shown in the street level image.

Figure 8:
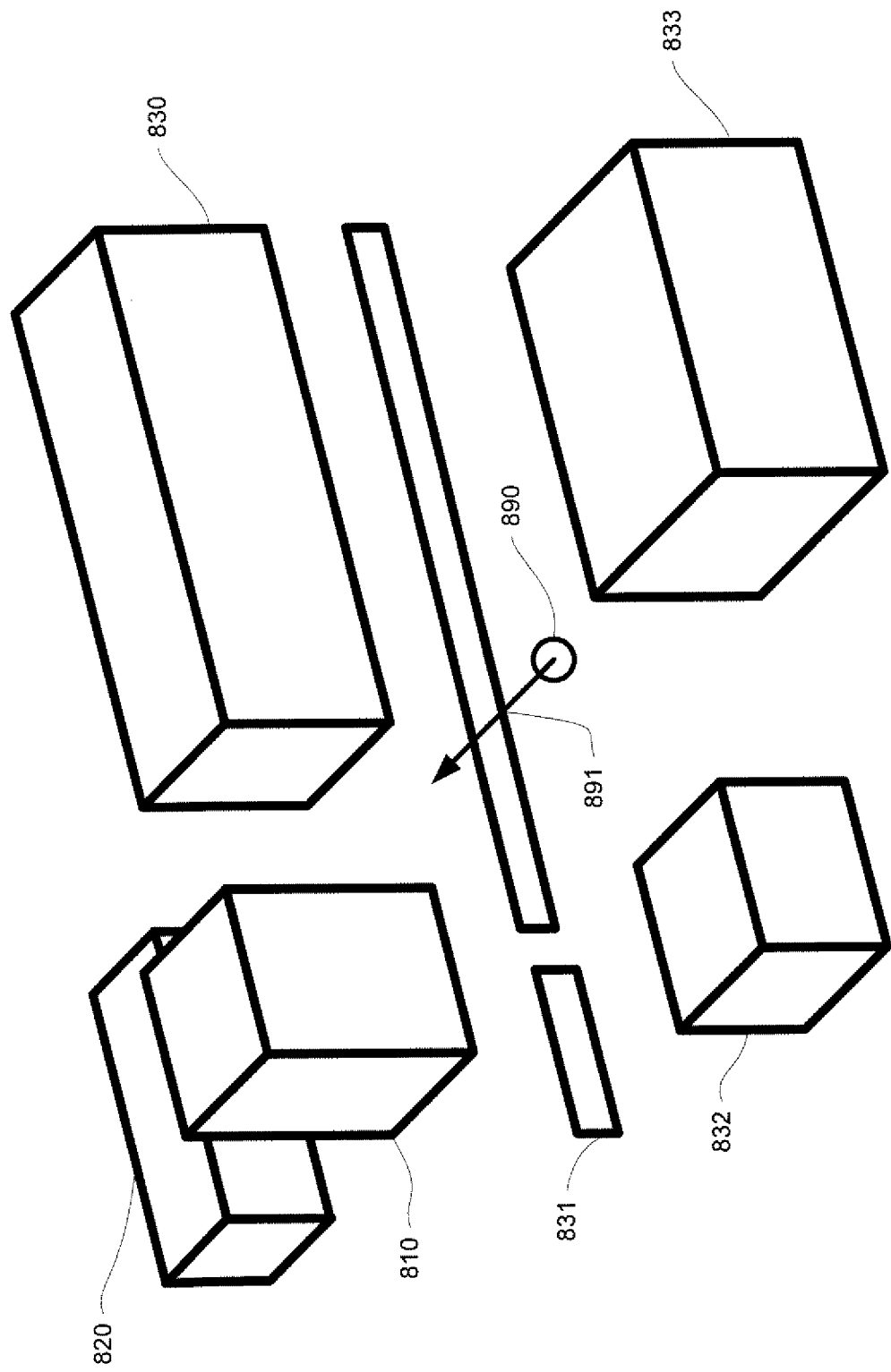
FIG. 8 is a functional diagram of data representing the surfaces of buildings in the street level image of FIG. 7.

Although the buildings shown in FIG. 8 are modeled as simple box-shaped objects with rectangular sides—and the example object-dependant cursors of FIGS. 9-11 reflect these simple models—the models may be far more complex. They may include indentations (such as windows), extensions (such as balconies and water towers), and non-rectangular shapes (such as triangles and curves). Accordingly, in some aspects of the system and method, the object-dependant cursor will wrap in and around such windows, balconies, towers, etc. Moreover, the surface data used to configure the shape of the object-dependant cursor may be kept simple (for aesthetic or processing reasons) even if the surfaces of the buildings displayed in the actual street level image are a complex collection of indentations, protrusions and curves.

The system and method may also ignore certain surfaces for the purpose of shaping and sizing the cursor. For example, the surface of the lamppost 1190 in FIG. 11 may be too small to provide meaningful information for the purpose of drawing the cursor. Accordingly, if the mouse cursor is over the lamppost, the system and method may ignore the lamppost for the purpose of determining the visual characteristics of the object-dependant cursor and use the surface behind it instead, such as building wall 1195. Objects deemed too small or otherwise inappropriate for the rendering the object-dependant cursor may be filtered by setting the object's depth/position information equal to that of the object behind it. For example, if the surface information 276 is stored as the distance from the camera position to the object at each pixel of the street level image, surfaces that are only a few pixels wide may have their values changed to the same distance as the surrounding pixels. Pattern matching may also be used to identify surfaces associated with other objects, such as cars and people.

Figure 13:
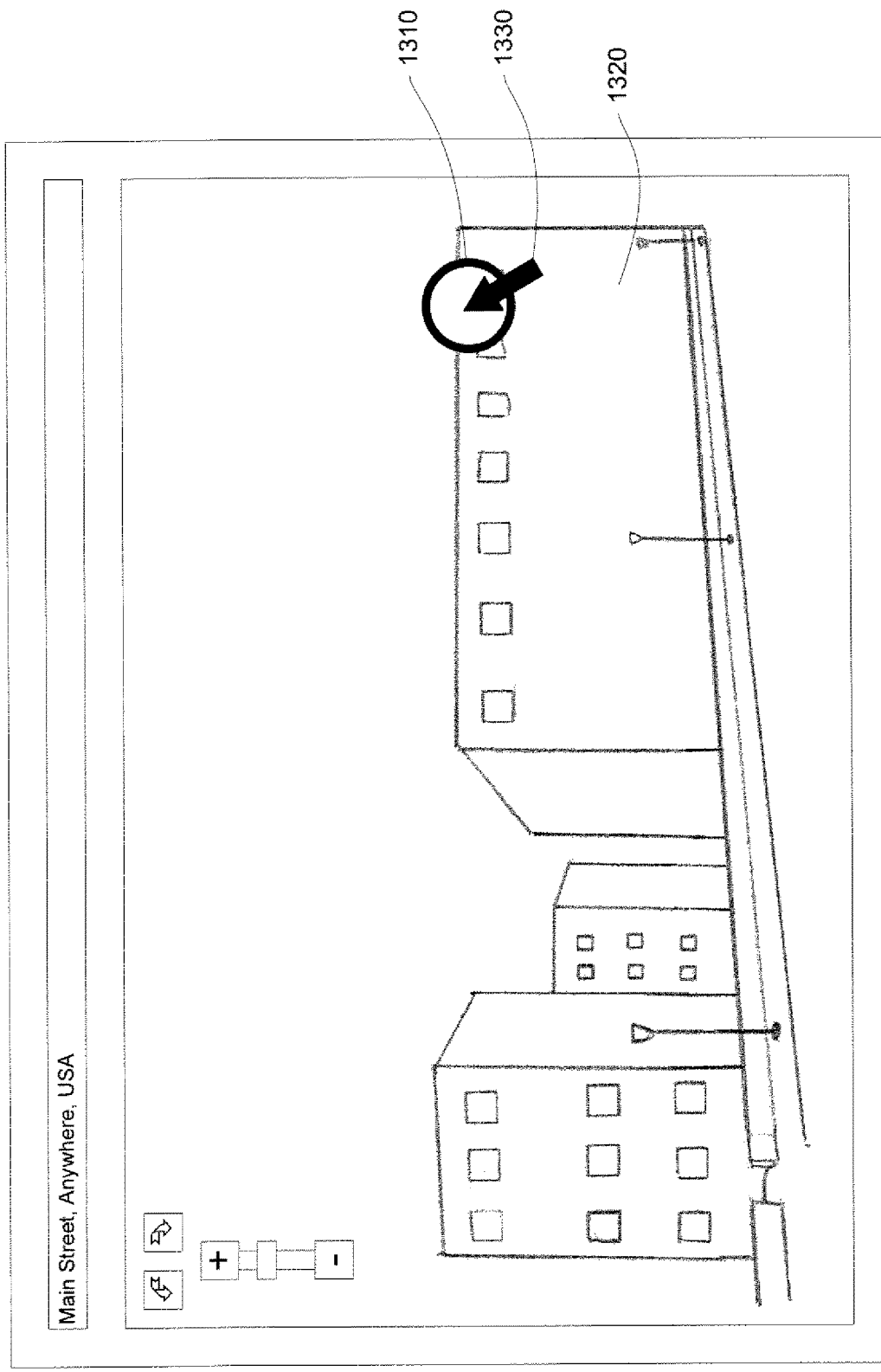
FIG. 13 is a screen shot in accordance with an aspect of the invention.

In yet another aspect, the system and method does not wrap the object around the edge of an object. Rather, as shown in FIG. 13, the system and method may determine the characteristics of the object-dependant cursor based solely on the point below the mouse cursor. In that regard, the object-dependant cursor 1310 may hang over the building 1320 if the mouse cursor 1330 points at the edge of the building 1320.

If no surface is found at the particular screen position, the shape of the object-dependant cursor may change accordingly, such as showing a mouse cursor but no object-dependant cursor (as shown in FIG. 7) or showing a different shape (such as a question mark).

Yet further, the mouse cursor may not be shown at all, such that only the object-dependant cursor is shown. In addition, the location of the object-dependant cursor does need not need to correlate with the mouse cursor's screen position at all times. For example, the calculations required to display the object-dependant cursor may cause the display of the object-dependant cursor to lag behind the mouse cursor. Moreover, in one aspect, the object-dependant cursor does not automatically move with the mouse cursor. Instead, the object-dependant cursor may move when the user requests, such as by clicking a button of the mouse, or whenever the screen position of the mouse cursor has hovered over the same screen position for some period of time.

The object-dependant cursor may also be moved independently of the user operating user input devices. For example, the cursor may be moved in accordance with a predefined program or in a manner to highlight the surfaces.

The shape is not limited to circles and changing the size. For example, the shape may be a square, oval, star or any other shape.

Moreover, while changing the size of the cursor relative to the screen size may be particularly advantageous, other embodiments may include other changes such as a change in shape (from circle to rectangle) or color (from light yellow to dark yellow). Additionally, the shape, color, and configuration of the pancake cursor may be updated in real-time. The object-dependant cursor may also be somewhat transparent, with the transparency being determined based on information associated with the objects in the street level image.

In yet another aspect, some of the characteristics of the object-dependant cursor are intended to convey information unrelated to the surfaces or distance of the objects shown in the street level image. For example, changing the color to red or the shape to a magnifying glass may indicate that the map database stores a street level image with a camera position closer to the building under the object-dependant cursor than the camera position of the street level image currently being displayed. The user could then click the building to move closer.

In that regard, the system and method may include cursors having some visual characteristics that are dependant on the distance or surface of the objects shown in the street level images, some visual characteristics that are independent of such objects but dependant on information contained in the map database, and yet other visual characteristics that are independent of both such objects and database.

Figure 12:
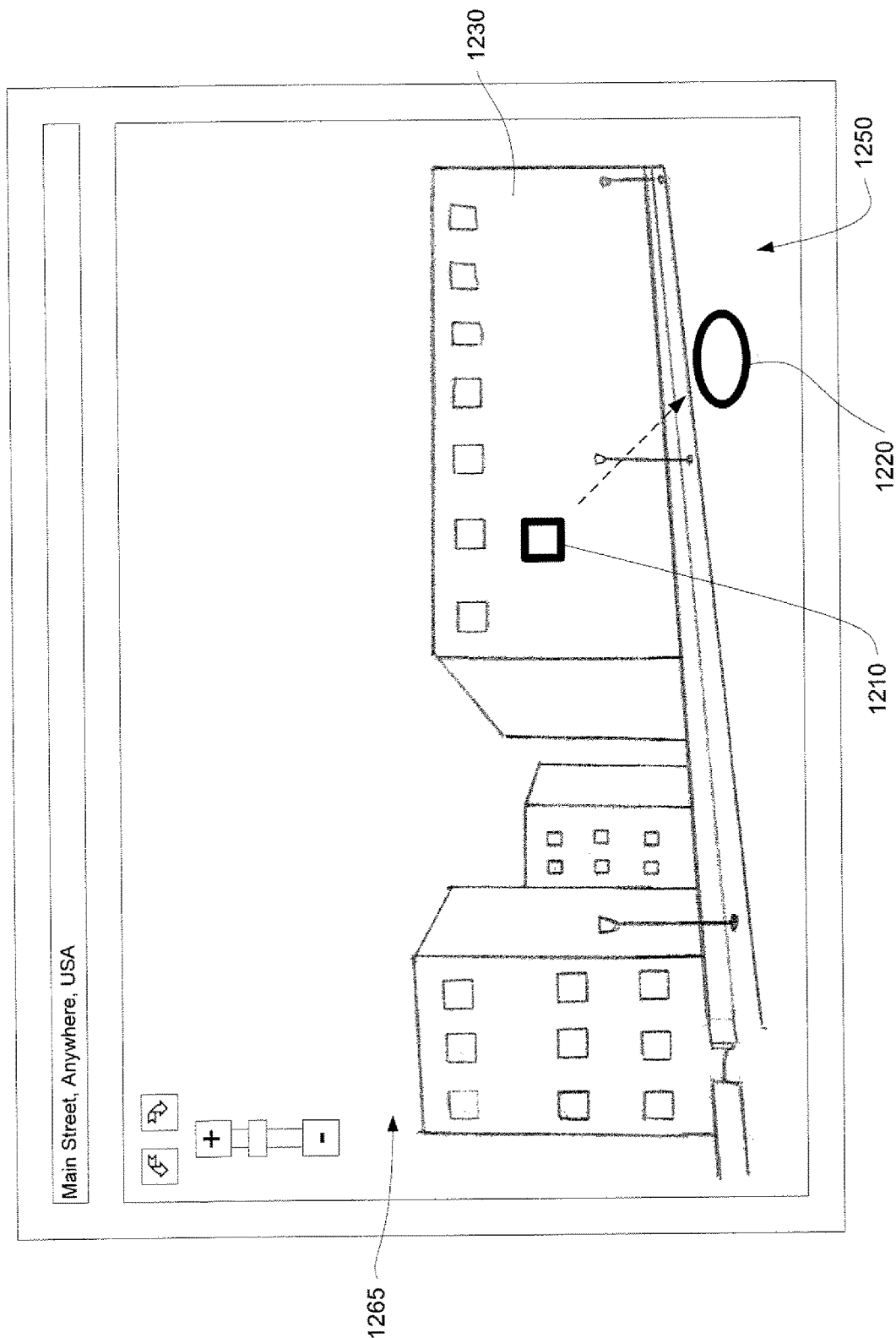
FIG. 12 is a screen shot in accordance with an aspect of the invention.

In one aspect, the shape of the cursor, or another visual characteristic of the cursor, reflects the nature of the geographic object under the cursor. For example, as shown in FIG. 12, the cursor may have a rectangular shape 1210 when it is on building 1230 in the street level image 1265, but a circular shape 1220 when it is moved onto street 1250 in the same image.

The shape may also reflect the orientation of the surface of the object. In that regard, a rectangle may be used when the surface of the object under the cursor is generally orthogonal to the ground (e.g., a building). In contrast, a circle may be used when the surface of the object under the cursor is generally parallel to the ground (e.g., a street).

Yet further, the shape of the cursor may indicate what will happen upon user activation (such as by clicking the mouse or hitting the enter key). For example, if the street level image is oriented so that it is looking down the street with buildings on the side, clicking on a building may change the orientation of the viewpoint so that a street level image is shown facing the building. However, clicking on a street may change the position of the viewpoint (such as down the street) without changing the orientation. In that regard, a rectangular shape, with the bottom of the rectangle oriented parallel to the street, may be used to indicate the change in orientation, whereas a circular shape may indicate that the orientation will not change.

Yet further, the shape may reflect multiple conditions, such as both the type of geographic object and what will happen upon user activation.

Still another aspect of the system and method provides information that associates other street level images with the information contained in the street level image being displayed. Server 110 may thus provide client computer 150 with data defining, for each pixel of the street level image, the identity of a different street level image 274 to be displayed when that pixel is selected. For example, the data may identify one street level image to be shown when a building in the distance is clicked and yet another street level image to be shown when a nearby bridge is clicked. This information may be calculated by the server 110 in advance of a request by a user 190, thus allowing the next street level image to be more rapidly determined than by (1) determining the latitude/longitude position of the object in the image that was clicked, (2) determining the closet street level image to that latitude/longitude position, and (3) displaying the street level image.

In one aspect of the system and method, the cursor has a minimum and maximum size. For example, the minimum cursor size may be determined as the smallest visually acceptable size for indicating the surface of an object at the furthest point in the image. Similarly, the largest cursor size may be determined as the largest visually acceptable size for indicating the surface of the surface at the nearest point in the image. Thus, as the user selects locations starting from the nearest location to the furthest location in the image, the size of the cursor may respectively transition from the largest size to the smallest size.

In still another aspect, the cursor changes based on the distance to a position of the object that does not correspond to its camera-facing surfaces, such as a building's center.

In one aspect, the size of the object-dependant cursor may be selected by the user. By way of example, the user may click and drag over a contiguous area of the street level image, in which case the object-dependant cursor is sized to correspond with the dragged area.

The object-dependant cursor may also be offset relative to the screen position of the mouse cursor. For example, if the street level image is displayed on a touch-screen, the object-dependant cursor may be obscured by the user's finger. Accordingly, the object-dependant cursor may reflect the surface of an object, and be displayed, at a point that is above the mouse cursor, e.g., a few pixels above the point at which the user is touching the screen.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention should not be interpreted as limiting the invention to the specific examples; rather, the examples are intended to illustrate only one of many possible embodiments.

The invention claimed is:

1. A method, comprising:
   receiving an image captured by a camera, the image including a geographical object;
   receiving surface data associated with a surface of the geographical object and a distance from the surface to the camera;
   providing the image for presentation on an electronic display;
   receiving a screen position which identifies a position on the image relative to the electronic display;
   obtaining, by at least one processor, surface data based on whether the screen position corresponds with a location of the surface within the image;

determining, by the at least one processor, a visual characteristic of a cursor based on the surface data obtained by the at least one processor and the distance from the surface to the camera; and providing the cursor with the visual characteristic for presentation on the electronic display such that the visual characteristic indicates a distance from the surface to the camera.

2. The method of claim 1, wherein when the cursor is moved to a first screen position which corresponds to a location of a first surface of a first geographical object having a first distance from the first surface to the camera, the method includes providing the cursor with a first visual characteristic indicating the first distance, and when the cursor is moved to a second screen position which corresponds to a location of a second surface of a second geographical object having a second distance from the second surface to the camera, the method includes providing the cursor with a second visual characteristic indicating the second distance, the second visual characteristic being different from the first visual characteristic.

3. The method of claim 2, wherein the first distance is less than the second distance, and a size of the first visual characteristic is larger than a size of the second visual characteristic.

4. The method of claim 3, wherein the first visual characteristic includes a circle having a first diameter, and the second visual characteristic includes a circle having a second diameter which is less than the first diameter.

5. The method of claim 3, wherein the first visual characteristic includes a polygon having a first area, and the second visual characteristic includes a polygon having a second area which is less than the first area.

6. The method of claim 2, wherein when the cursor is moved from the first screen position to a third screen position which corresponds to a location of a third surface of a third geographical object, the method includes providing the cursor with a third visual characteristic indicating a type of the third geographical object, the type of the third geographical object being different than a type of the first geographical object.

7. The method of claim 6, wherein the type of the third geographical object is a travel route and the type of the first geographical object is a building.

8. The method of claim 7, wherein the first visual characteristic includes at least one of a first shape, a first size, or a first color, and the third visual characteristic includes at least one of a third shape, a third size, or a third color, the third visual characteristic being different from the first visual characteristic.

9. The method of claim 1, wherein when the surface data associated with a surface of the geographical object indicates a size of the geographical object is less than a threshold value, the distance from the surface of the geographical object to the camera is based on a distance from a surface of another geographical object to the camera, the another geographical object being disposed adjacent to or behind the geographical object.

10. A method, comprising:

receiving an image captured by a camera, the image including a plurality of geographical objects including a first geographical object and a second geographical object, the first geographical object being a different type of geographical object than the second geographical object;

receiving surface data associated with a first surface of the first geographical object and a second surface of the second geographical object;

providing the image for presentation on an electronic display;

receiving a screen position which identifies a position on the image relative to the electronic display;

obtaining, by at least one processor, surface data based on whether the screen position corresponds with a location of the first surface within the image or a location of the second surface within the image;

when the screen position corresponds with the location of the first surface within the image, providing a cursor with a first visual characteristic for presentation on the electronic display; and when the screen position corresponds with the location of the second surface within the image, providing the cursor with a second visual characteristic for presentation on the electronic display, the second visual characteristic being different from the first visual characteristic to indicate a difference in the type of the geographical object between the first geographical object and the second geographical object.

11. The method of claim 10, wherein when the screen position corresponds with the location of the first surface within the image, the first visual characteristic further indicates a first distance from the first surface to the camera, and when the screen position corresponds with the location of the second surface within the image, the second visual characteristic further indicates a second distance from the second surface to the camera.

12. The method of claim 11, wherein the first distance is less than the second distance, and a size of the first visual characteristic is larger than a size of the second visual characteristic.

13. The method of claim 12, wherein the first visual characteristic includes a circle having a first area, and the second visual characteristic includes a rectangle having a second area which is less than the first area.

14. The method of claim 13, wherein the type of the first geographical object is a travel route and the type of the second geographical object is a building.

15. The method of claim 10, wherein when the surface data associated with the first surface of the first geographical object indicates a size of the first geographical object is less than a threshold value, a distance from the first surface of the first geographical object to the camera is based on a distance from a third surface of a third geographical object to the camera, the third geographical object being disposed adjacent to or behind the first geographical object.

16. The method of claim 10, further comprising:

providing the cursor with the first visual characteristic based on a distance from the first surface to the camera, wherein at least one of a size, a shape, or a color of the first visual characteristic changes based on the distance from the first surface to the camera; and providing the cursor with the second visual characteristic based on a distance from the second surface to the camera, wherein at least one of a size, a shape, or a color of the second visual characteristic changes based on the distance from the first surface to the camera.

* * * * *